United States Patent [19]

Schmaling et al.

[11] Patent Number: 5,460,487
[45] Date of Patent: Oct. 24, 1995

[54] PITCH ADJUSTMENT ASSEMBLY FOR BEARINGLESS MAIN ROTORS

[75] Inventors: David N. Schmaling, Oxford, Conn.; Francis E. Byrnes, White Plains, N.Y.

[73] Assignee: United Technologies Corporation, Hartford, Conn.

[21] Appl. No.: 336,460

[22] Filed: Nov. 9, 1994

[51] Int. Cl.$^6$ .................................................. B64C 27/35
[52] U.S. Cl. ...................... 416/134 A; 416/138; 416/140; 416/141; 416/61; 267/140.2
[58] Field of Search ...................... 416/106, 107, 416/134 A, 138, 140, 141, 61; 384/221; 267/140.2, 141.1, 141.2, 294

[56] References Cited

U.S. PATENT DOCUMENTS

| | | |
|---|---|---|
| 4,244,677 | 1/1981 | Noehren et al. . |
| 4,690,616 | 9/1987 | Hahn et al. ........................ 416/134 A |
| 4,778,343 | 10/1988 | Hahn et al. ........................ 416/134 A |
| 5,092,738 | 3/1992 | Byrnes et al. . |
| 5,199,849 | 4/1993 | Leman .............................. 416/134 A |

*Primary Examiner*—Edward K. Look
*Assistant Examiner*—Christopher Verdier
*Attorney, Agent, or Firm*—Brian A. Collins

[57] ABSTRACT

A pitch adjustment assembly (100) for a bearingless rotor assembly (20) which includes a torque tube member (36) enveloping a flexbeam connector (22), which torque tube member (36) defines a geometric center (120) and is operative to impart pitch motion to the rotor blade assembly (20). The pitch adjustment assembly (100) includes a centering bearing (70) for centering an inboard end (38) of the torque tube member (36) relative to the flexbeam connector (22), wherein the centering bearing (70) defines a torque tube pivot point (110) about which the torque tube member (36) is rotationally displaced relative to the flexbeam connector (22), a pitch control rod (48) mechanically connecting to a pitch control arm (46) for imparting pitch control inputs to the torque tube member (36); wherein the pitch control rod and arm (46, 48) define an input pivot point (116) and, a displacement mechanism (102 or 140), in combination with the centering bearing (70), for effecting translational displacement of the geometric center (120) of the torque tube member (36) relative to the torque tube and input pivot points (110, 116). The displacement mechanism (102 or 140) cooperates with the centering bearing (70) to effect translational displacement of the torque tube inboard end (38) while maintaining the spatial position of the input pivot point (116) relative to the torque tube pivot point (110). Adjustment shims (102) or a jacking arrangement (140) is used to effect the translational displacement of the torque tube member (36).

12 Claims, 5 Drawing Sheets

PITCH ADJUSTMENT ASSEMBLY FOR BEARINGLESS MAIN ROTORS

TECHNICAL FIELD

The present invention relates to helicopter bearingless rotors and, more particularly, to such rotors having a flexbeam connector and enveloping torque tube member for imparting pitch motion to a helicopter rotor blade and, more particularly, to a new and useful assembly which facilitates pitch position adjustment of the torque tube member relative to the flexbeam connector.

BACKGROUND OF THE INVENTION

Helicopter rotor designs are increasingly utilizing a flexible structural member, commonly termed a "flexbeam" or "flexbeam connector", for retention of a helicopter rotor blade to a torque drive hub member. Basic operational constraints of rotary wing flight impose substantial functional complexity upon the rotor flexbeam necessitated by various needs to control accurately multi-directional displacement of the rotor blades, i.e., flapwise and edgewise bending, and torsional or pitch change motions. As such, these configurations are termed "Bearingless Rotors" inasmuch as they replace antiquated bearing element rotors which accommodate motion by hinge or journal type bearings at the rotor blade root end. The flexbeam connector, which is typically comprised of fiber reinforced resin matrix materials, reduces the weight, complexity, and maintenance of the rotor assembly while, furthermore, improving the reliability and damage tolerance thereof.

Bearingless rotors of the varieties described in U.S. Pat. Nos. 4,244,677, and 5,092,738 typically include a torque tube member enveloping each of the flexbeam connectors for imparting pitch motion to the rotor blades. The torque tube member rigidly mounts outboard to the root end of the rotor blade and articulately mounts inboard to the upper and lower surfaces of the flexbeam connector. The articulate mount is effected by a centering bearing, commonly identified by the appellation "snubber bearing", which performs the functions of centering the torque tube member relative to the flexbeam connector for pitch change and flapping motion, accommodating lead-lag motion between the torque tube member and the flexbeam connector and transferring pitch control and other loads therebetween. Centering bearings, such as those described in the above-identified U.S. Patents, are typically comprised of a plurality of spherical and flat elastomeric laminates, which spherical laminates accommodate pitch change and flapwise bending motion and which flat laminates permit a small degree of radial and a larger degree of edgewise motion. The flat laminates are, furthermore, comprised of high loss elastomer material for providing edgewise, or lead-lag, vibration damping.

Pitch control inputs are imparted to the rotor blade assembly i.e., the torque tube, flexbeam connector and rotor blade, by pitch control rods which are articulately mounted at an upper end to the torque tube and pivotally mounted at an opposing end to a swashplate assembly. The spatial displacement of the swashplate causes linear displacement of the pitch control rods to effect rotational displacement of the torque tube member about the pitch axes of the respective rotor blade. The torque tube member, therefore, imparts pitch motion to the rotor blade to vary the flight profile, e.g., speed, pitch, roll of the helicopter.

In addition to the primary function of providing pitch control inputs to the rotor blades, the pitch control rods of the prior art provide tracking correction for the corresponding rotor blade. Manufacturing deviations and rotor blade erosion can vary the aerodynamic characteristics of a rotor blade, which deviations can cause the rotor blades to track dissimilar tip-plane paths when in operation. Such "out-of-track" rotor blade condition results in increased rotor vibration and degraded aerodynamic performance. Pitch change adjustments for correcting rotor blade tracking errors are typically made by moving the swashplate to a static reference position and adjusting the axial length of the control rod to alter the initial pitch setting i.e., angle of attack, of the rotor blade. Generally, only small adjustments are required, on the order of ±1 degree, to effect the necessary corrections to properly track the rotor blades.

FIG. 1 depicts a prior art pitch control rod 200 comprising upper and lower rod end portions 202, 204, each having threaded shaft end portions 206, 208 which are mechanically interconnected by a threaded barrel member 210. The barrel member 210 functions similar to the operation of a turnbuckle insofar as rotation of the barrel 210 causes simultaneous axial displacement of the upper and lower rod end portions 202, 204. Axial displacement is effected by the use of right and left handed threads on the shaft end portions 206, 208. The barrel 210 is locked in position by upper and lower jam nuts 212, 214 and redundantly retained by a locking key 216 which engages one of a plurality of circumferential castellations 218 formed along the upper end of the barrel 210. The locking key 216, which also engages an axial slot 220 formed in the upper threaded shaft end portion 206, is retained in one of the circumferential castellations 218 by the upper jam nut 212 thus providing a positive anti-rotational feature for the pitch control rod 200. Accordingly, by repositioning the barrel 210 i.e., turning the barrel clockwise or counterclockwise, the length of the pitch control rod is varied to effect pitch position adjustments of the torque tube member and, consequently, the rotor blade assembly.

While the prior art pitch control rod 200 described hereinabove is functionally adequate for providing pitch control inputs to the rotor blade assembly and for providing tracking correction therefor, the pitch control rod has certain inherent disadvantages and limitations. For example, the threaded and slotted components, i.e., the upper and lower rod end portions 202, 204 of the barrel 210, and the upper and lower jam nuts 212, 214, are not amenable to lightweight composite material construction. As such, the control rods of the prior art are typically fabricated from a metallic material such as steel or titanium, which increases the overall aircraft weight. The pitch control rod is also highly mechanically complex which results in increased fabrication and maintenance costs, and furthermore requires additional procedural steps to ensure that all safety requirements, i.e., proper torque loading of the jam nuts and engagement of the locking key etc., have been attended to. Moreover, the multiplicity of component parts increases the number of possible failure modes and the probability of operator error.

A need, therefore, exists to provide a pitch adjustment assembly for rotor blade tracking which is lightweight, simple to use, and requires fewer component parts than existing pitch adjustment mechanisms.

DISCLOSURE OF INVENTION

It is an object of the invention to provide a pitch adjustment assembly for a helicopter bearingless rotor assembly which is less mechanically complex and incorporates fewer component parts.

It is another object of the present invention to provide a pitch adjustment assembly for a helicopter bearingless rotor assembly which facilitates adjustment without the requirement for extensive disassembly of the pitch adjustment assembly.

It is yet another object of the invention to provide a pitch adjustment assembly for a helicopter bearingless rotor assembly which facilitates the use of a composite-formed pitch control rod for reducing overall system weight.

It is still another object of the present invention to provide a pitch adjustment assembly for a helicopter bearingless rotor assembly including a centering bearing employing elastomer material for accommodating torque tube motion while, concomitantly, applying a compressive preload in the elastomer material.

The present invention provides a pitch adjustment assembly for a bearingless rotor assembly having a torque tube member enveloping a flexbeam connector, which torque tube member defines a geometric center and is operative to impart pitch motion to the rotor blade assembly. The pitch adjustment assembly comprises means for centering an inboard end of the torque tube member relative to the flexbeam connector, wherein the centering means defines a torque tube pivot point about which the torque tube member is rotationally displaced relative to the flexbeam connector, means for imparting pitch control inputs to the torque tube member, wherein the pitch control input means defines an input pivot point, and displacement means, in combination with the centering means, for effecting translational displacement of the geometric center of the torque tube member relative to the torque tube and input pivot points.

More specifically, the displacement means cooperates with the centering means to effect translational displacement of the torque tube inboard end while maintaining the spatial position of the input pivot point relative to the torque tube pivot point. The preferred centering means includes a central mounting portion, upper and lower attachment fittings and motion accommodating elastomer disposed between the central mounting portion and each of the attachment fittings. Preferably, the central mounting portion connects to the flexbeam connector while the upper an lower attachment fittings are mechanically interconnected to the torque tube member by the displacement means. The displacement means may include adjustment shims or a jacking arrangement interposed between the upper and lower attachment fittings and the torque tube member. To provide access to the attachment fittings, apertures are formed in the torque tube member to facilitate interposition of the displacement means between the attachment fittings and the torque tube member.

The jacking arrangement includes housing members which mechanically interconnect the attachment fittings to the torque tube member and a jacking plate disposed in each housing member, which jacking plates engage the attachment fittings and are operative to raise or lower the torque tube center relative to the torque tube pivot point. In addition to effecting pitch position adjustment, the jacking arrangement is also useful for applying a compressive preload in the motion accommodating elastomer of the preferred centering means.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 2a is a partial side view of a helicopter bearingless rotor assembly which is partially broken away and partially in section showing the primary components for imparting pitch control inputs thereto;

FIG. 2b is a partially broken away top view of the helicopter bearingless rotor assembly of FIG. 2a;

BEST MODE FOR CARRYING OUT THE INVENTION

Figure 1:
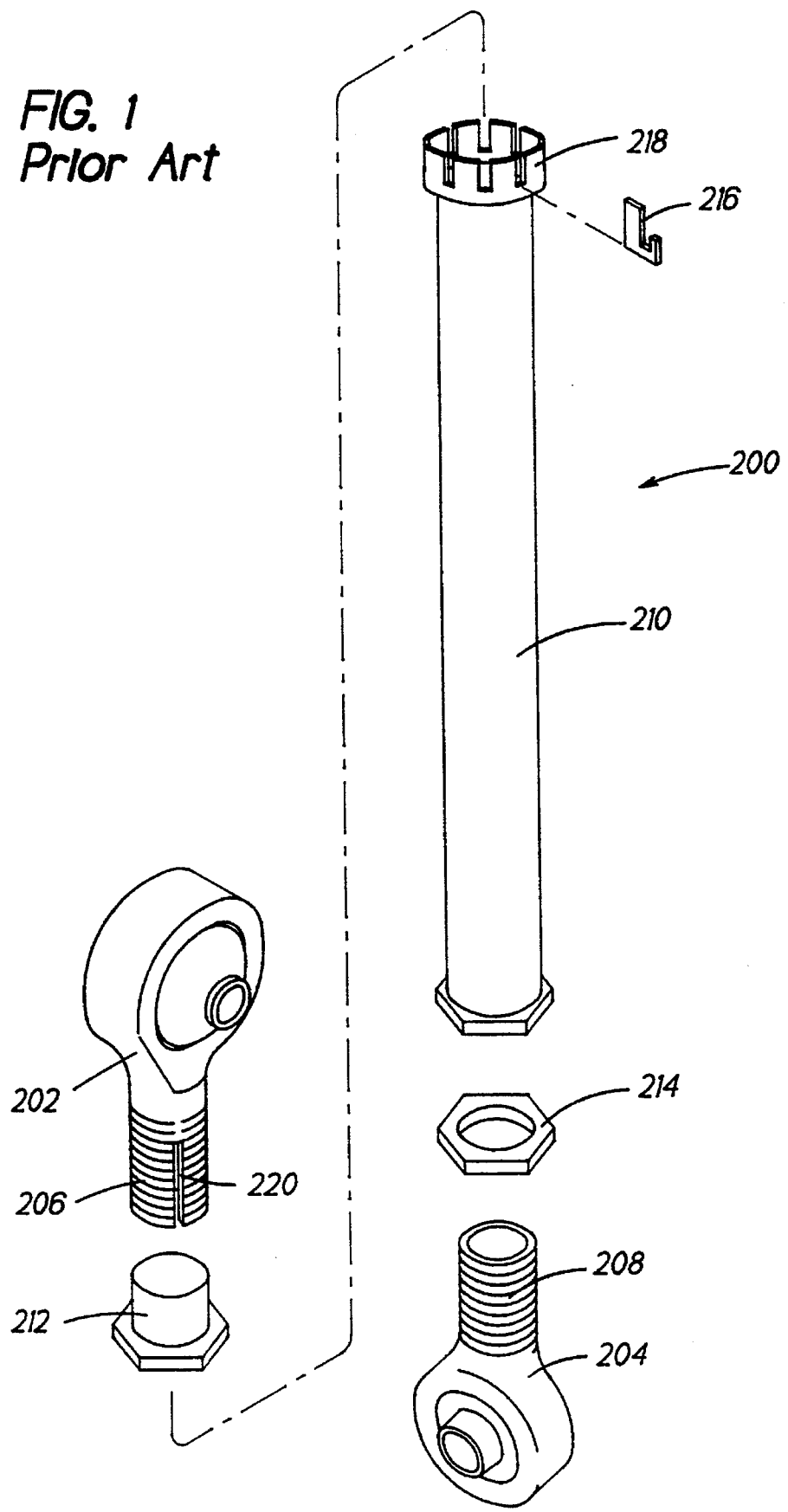
FIG. 1 depicts an exploded view of a prior art adjustable pitch control rod.
Figures 2A, 2B:
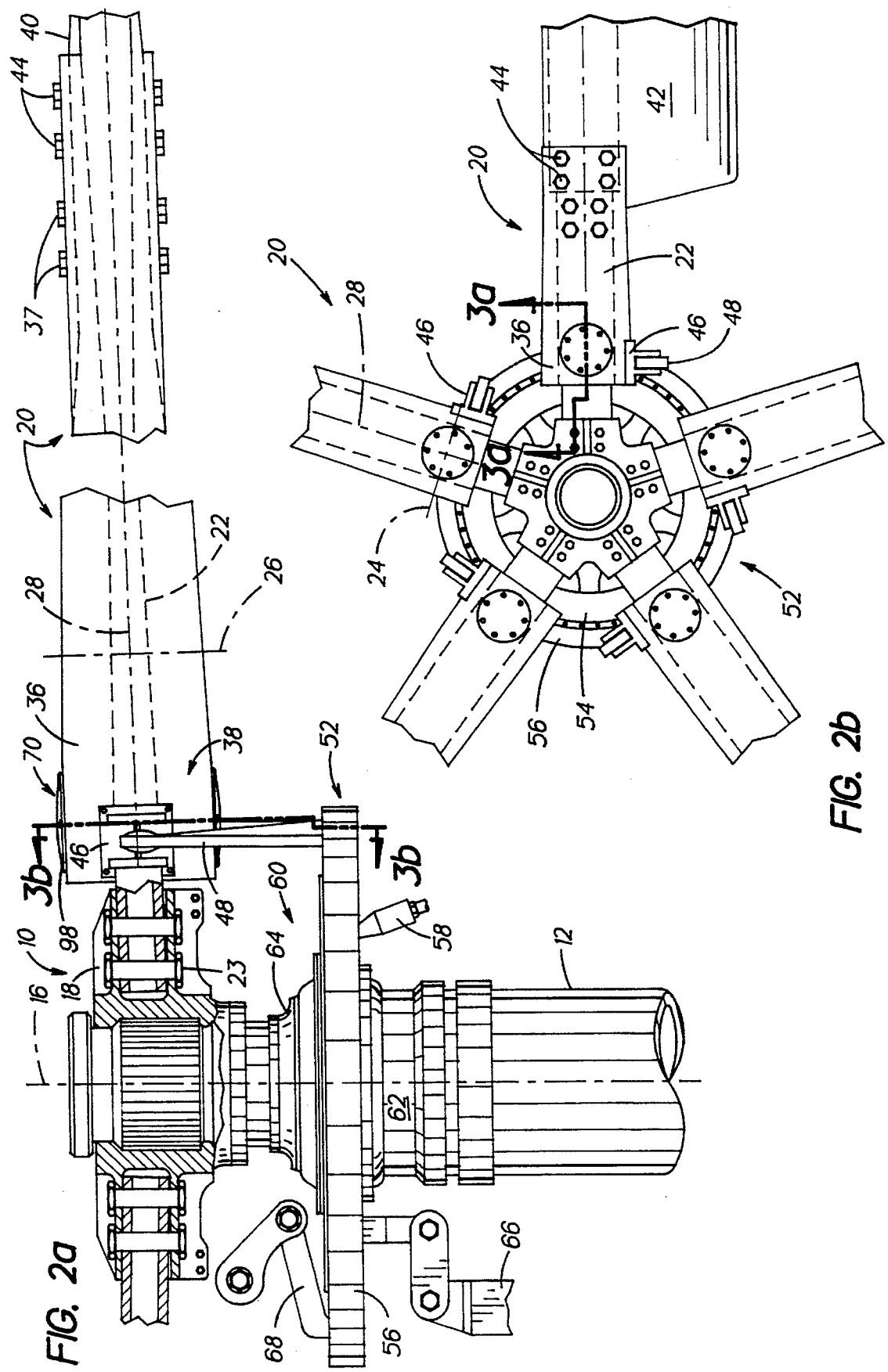

Referring now to the drawings wherein like reference characters identify corresponding or similar elements throughout the several views, FIGS. 2a and 2b show the relevant portions of a helicopter bearingless rotor assembly 10 which includes a drive shaft 12 which rotates about an axis of rotation 16. A torque drive hub member 18 is mounted to the drive shaft 12 and drives a plurality of rotor blade assemblies 20. Each blade assembly 20 includes a flexbeam connector 22 which is mounted at an inboard end thereof to the torque drive hub member 18 by connecting bolts 23. The flexbeam connector 22 is, furthermore, compliant about flap, lead-lag and pitch change axes 24, 26 and 28, respectively, so as to accommodate multi-directional displacement of the rotor blade assembly 20.

A torque tube member 36 envelopes the flexbeam connector 22 and is mounted thereto at its radially outer end by connecting bolts 37 and articulately mounted at an inboard end 38 by a centering bearing 70. The radial outer end of the torque tube member 36 also mounts to and envelops the root end spar structure 40 of each rotor blade airfoil 42 by a series of connecting bolts 44.

A pitch control arm 46 is affixed to the torque tube member 36 and receives pitch control inputs from pitch control rods 48 which are articulately mounted at one end to the pitch control arm 46 and pivotally mounted at the other end to an in-plane swashplate assembly 52. The swashplate assembly 52 includes inner stationary and outer rotating swashplate rings 54 and 56, respectively, which receive pitch control inputs from at least three (3) control input members 58 to position the swashplate assembly 52 in a desired planar orientation. The stationary inner swashplate ring 54 is mounted to a uniball mount 60 which permits axial and tilt translation of the swashplate assembly 52 relative to the rotational axis 16. The uniball mount 60 slides vertically on a stationary standpipe 62 to accommodate axial motion of the swashplate assembly 52 and includes a semispherical bearing surface 64 to guide and center the swashplate assembly 52 during tilt translation thereof. Spatial displacement of the swashplate assembly 52, therefore, causes linear displacement of the pitch control rods 48 to effect rotational displacement of the torque tube member 36 about the pitch axes 28 of the respective rotor blade assemblies 20.

Torque is applied to the stationary and rotating swashplate rings 54, 56 by stationary and rotating scissors linkages 66 and 68, respectively, to maintain the necessary rotational position of the swashplate rings 54, 56 about the rotational axis 16. That is, the stationary scissors linkage 66 prevents rotation of the stationary swashplate ring 54 to maintain its rotational position relative to stationary components e.g., the control input members 58 and stationary standpipe 62, while the rotating scissors linkage 68 drives the rotating swashplate ring 56 to maintain its rotational position relative to the rotor hub assembly 10.

Figure 3A:
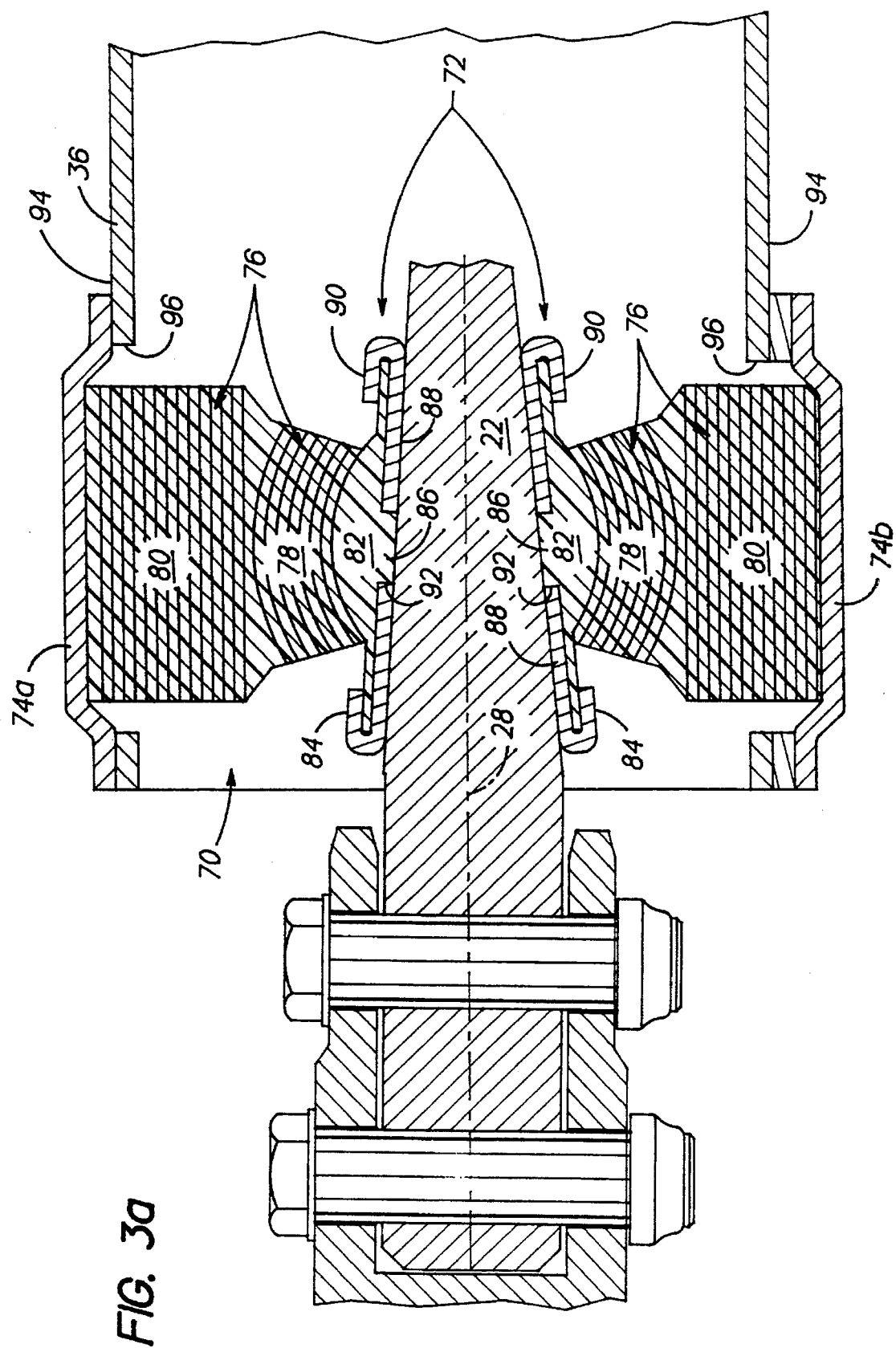
FIG. 3a is a cross-sectional view substantially along line 3a—3a of FIG. 2b.

In FIG. 3a, the torque tube member 36 is centered between and mounted to the flexbeam connector 22 by the centering bearing 70 which performs the primary functions of centering the torque tube member 36 about the flexbeam connector 22 and accommodating pitch change motion of the torque tube member about the pitch axis 28. While the centering bearing 70 can be viewed as a complementary pair of upper and lower bearing members, it will facilitate the discussion to describe the centering bearing 70 as a singular unit.

The centering bearing 70 is comprised of a central mounting portion 72, upper and lower attachment fittings 74a, 74b, and motion accommodating elastomer 76 disposed between, and preferably bonded to, the central mounting portion 72 and each of the attachment fittings 74a, 74b. More specifically, the motion accommodating elastomer 76 is comprised of alternating layers of resilient elastomer and non-resilient metallic shims which form spherical and flat elastomeric laminates 78 and 80, respectively. The spherical laminates 78 primarily function to accommodate pitch rotation of the torque tube member 36 about the pitch axis 28 and the flat elastomeric laminates 80, which are disposed between the spherical elastomeric laminates 78 and the attachment fittings 74a, 74b, function to permit a small degree of spanwise motion and a larger degree of edgewise or lead-lag motion. The flat laminates 80 are preferably comprised of high loss-factor elastomer to dampen vibratory lead-lag motion of the rotor blade assemblies 20.

The central mounting portion 72 includes centrally disposed bearing mounts 82 which are bonded, or otherwise affixed, to the spherical elastomeric laminates 78. The bearing mounts 82, furthermore, include integrally formed tabs 84 and a cylindrical reaction pin 86 for engaging a corresponding mounting retainer 88. Each mounting retainer 88 is bonded, or otherwise affixed, to the flexbeam connector 22 and includes arcuate end portions 90 and a central aperture 92 for respectively engaging the tabs 84 and the reaction pin 86 of the bearing mounts 82 thereby transferring all centering bearing loads to the flexbeam connector 22.

The upper and lower attachment fittings 74a, 74b are mounted to an external surface 94 of the torque tube member 36 and are bonded, or otherwise affixed, to the flat elastomeric laminates 80 of the motion accommodating elastomer 76. The outermost end portions of the flat elastomeric laminates 80 extend through apertures 96 formed in the torque tube member 36 to permit external mounting of the attachment fittings 74a, 74b. Such mounting location provides greater access for attachment and preload operations (discussed in greater detail below).

The combined height dimension of the spherical and flat laminates 78, 80 is prescribed such that a predetermined preload gap is initially formed between the upper and lower attachment fittings 74a, 74b and the external torque tube surface 94. As the attachment fittings 74a, 74b are brought into mating contact with the torque tube member 36 by connecting bolts 98 (see FIG. 2a), the elastomeric centering bearing 70 is compressed a select amount to effect a desired preload within the elastomeric laminates 78, 80. It is common practice to preload elastomeric bearings so that the elastomeric laminates thereof remain in compression throughout the full range of required motion. This is necessary inasmuch as elastomer material is characterized by low tensile strength and such preload or precompression prevents the imposition of tensile loads. Byrnes et al. U.S. Pat. No. 5,092,738 describes a bearingless main rotor including a centering bearing of the type described above including an assembly procedure for effecting preload.

Figures 3B, 5:
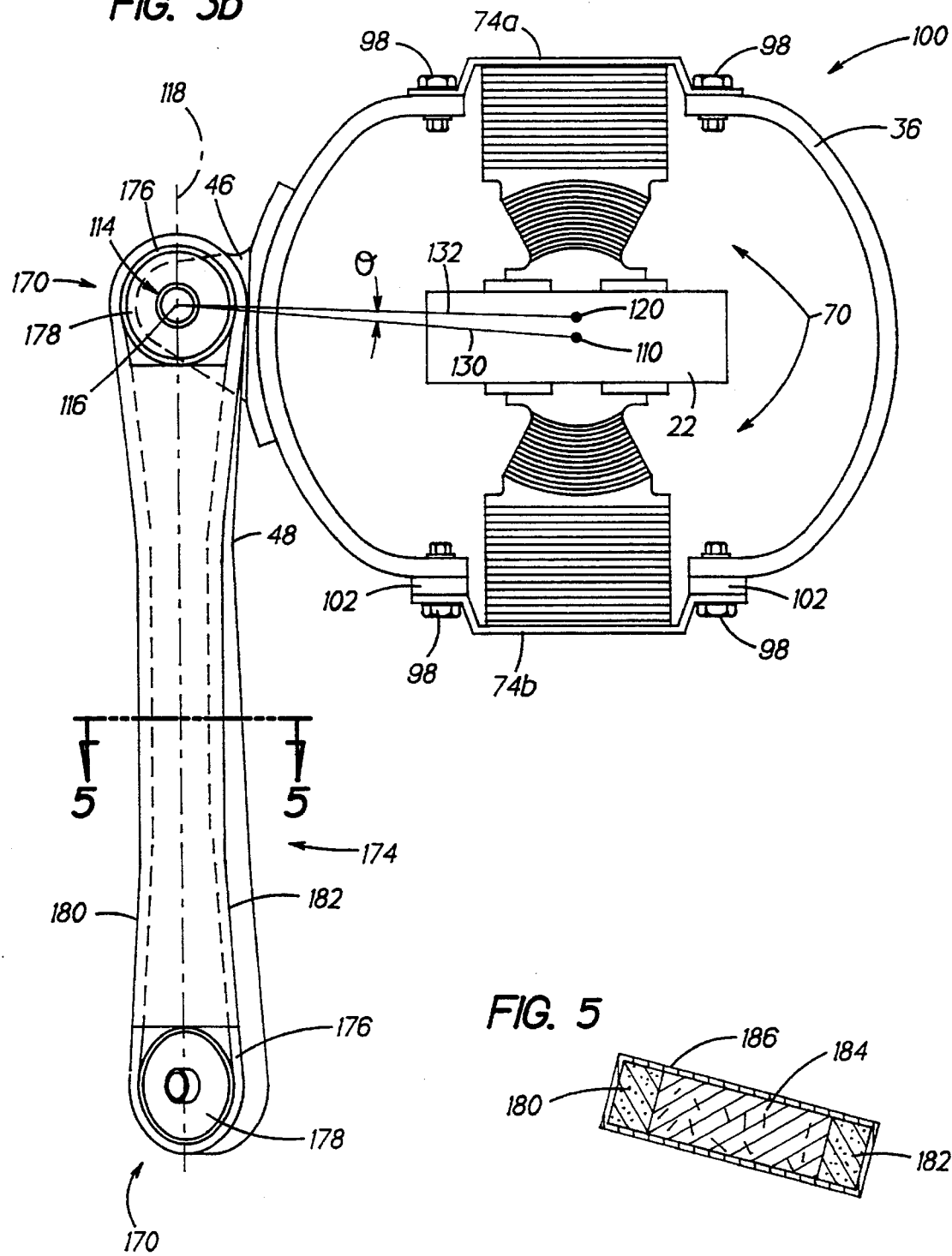
FIG. 3b is a cross-sectional view substantially along line 3b—3b of FIG. 2a which depicts the salient features of the present invention for effecting pitch change adjustment and, furthermore, depicts the use of adjustment shims interposed between a torque tube member and a centering bearing.
FIG. 5 is a cross-sectional view substantially along line 5—5 of FIG. 3b which depicts the internal construction of a fixed-length composite pitch control rod used in conjunction with the pitch adjustment assembly of the present invention.

Referring to FIG. 3b, the pitch adjustment assembly of the present invention effects a translational displacement of the inboard end of the torque tube member 36 relative to the flexbeam connector 22. Translational displacement is defined herein as a displacement in a plane which is generally normal to the pitch axis of the flexbeam connector 22, i.e., the plane defined by the present cross-sectional view. While a variety of mechanisms may be employed to effect such translational displacement, one embodiment of the present invention employs the use of adjustment shims 102 or spacers selectively interposed between the upper and lower attachment fittings 74a, 74b and the torque tube member 36. The adjustment shims 102 are retained therebetween by the aforementioned connecting bolts 98 disposed about the periphery of the attachment fittings 74a, 74b. Alternatively, a jacking arrangement 140, illustrated in FIG. 4, may be employed which facilitates pitch change adjustment while, concomitantly, applying a compressive preload to the elastomeric laminates 78, 80.

Preferably the displacement means 102 or 140 cooperates with the centering bearing 70 to effect translational displacement of the torque tube inboard end while maintaining the fixity of the pitch control rod 48, i.e., along the length thereof. More preferably, the displacement means 102 or 140 is interposed between the upper and lower attachment fittings 74a, 74b and the torque tube member 36. Such location provides accessibility for the operator when performing pitch position adjustments.

For the purposes of understanding the kinematics required for effecting pitch adjustment, several spatially defined points associated with the torque tube member 36 and the centering and pitch control input means, i.e., the centering bearing 70 and the pitch control arm/pitch control rod 46, 48, respectively, are described. The centering bearing 70 defines a torque tube pivot point 110 about which the torque tube member 36 is rotationally displaced relative to the flexbeam connector 22 and, furthermore, about with pitch adjustments are made. The pivot point 110, furthermore, lies in a transverse plane extending generally normal to the pitch axis of the flexbeam connector 22. The articulate mount 114 which connects the pitch control rod 48 and pitch control arm 46 defines a second point, or input pivot point 116, about which pitch control inputs and/or pitch adjustments are made. Furthermore, the input pivot point 116 is substantially fixed in space relative to the torque tube pivot point and is disposed along the longitudinal axis 118 of the pitch control rod 48 which is mechanically connected to the swashplate assembly (bearing in mind that the swashplate assembly is also spatially fixed when performing pitch position adjustments). The intersection of the longitudinal axis of the torque tube member 36 and a transverse plane, i.e., a plane which generally corresponds with the present cross-sectional view, defines a third point, or the geometric center 120 of the torque tube member 36.

The torque tube and input pivot points 110, 116 define a pitch reference line 130 indicative of the current pitch position of the torque tube member 36 relative to the flexbeam connector 22. The input pivot point 116 and the geometric center 120 of the torque tube member 36 define a second line, or pitch adjustment line 132, whereby the reference and pitch lines 130, 132 form a pitch angle θ therebetween. It will be apparent that by displacing the torque tube center 120 relative to the torque tube pivot point 110 and maintaining the relative spatial position of the input pivot point 116, the pitch angle θ, varies in accordance with the magnitude of the translational displacement (the distance between the torque tube pivot point 110 and the torque tube center 120). Accordingly, by selectively placing adjustment shims 102 between at least one of the attachment fittings 74a, 74b and the torque tube member 36 e.g., by shifting or removing an interposed shim or shims 102 from the lower attachment fitting 74a to the upper attachment fitting 74b, the torque tube center 120 is shifted translationally of the pitch axis 28 and with respect to the torque tube pivot point 110. The distance between the torque tube and input pivot points 110, 116 is commonly referred to as the "arm radius" which determines the magnitude of translational displacement necessary to effect the desired torque tube rotational or pitch adjustment displacement. Accordingly, the pitch angle θ, which is indicative of the pitch change adjustment, varies as a trigonometric function of the translational displacement and the arm radius.

As earlier discussed, prior art pitch adjustment mechanisms are configured to vary the axial length of the control rod to effect pitch position adjustment. Applying the same descriptive geometry to the prior art, it will be apparent that the torque tube pivot point 110, torque tube center 120 and input pivot point 116 are co-linear, i.e., disposed along the above-defined pitch reference line 130, and furthermore, the torque center 120 and torque tube pivot point 110 are, at all times, coincident. In contrast, the present invention variably displaces the torque tube center 120 relative to the torque tube pivot point 110, and, consequently, varies the pitch angle θ between the pitch reference and pitch adjustment lines 130, 132.

Figure 4A:
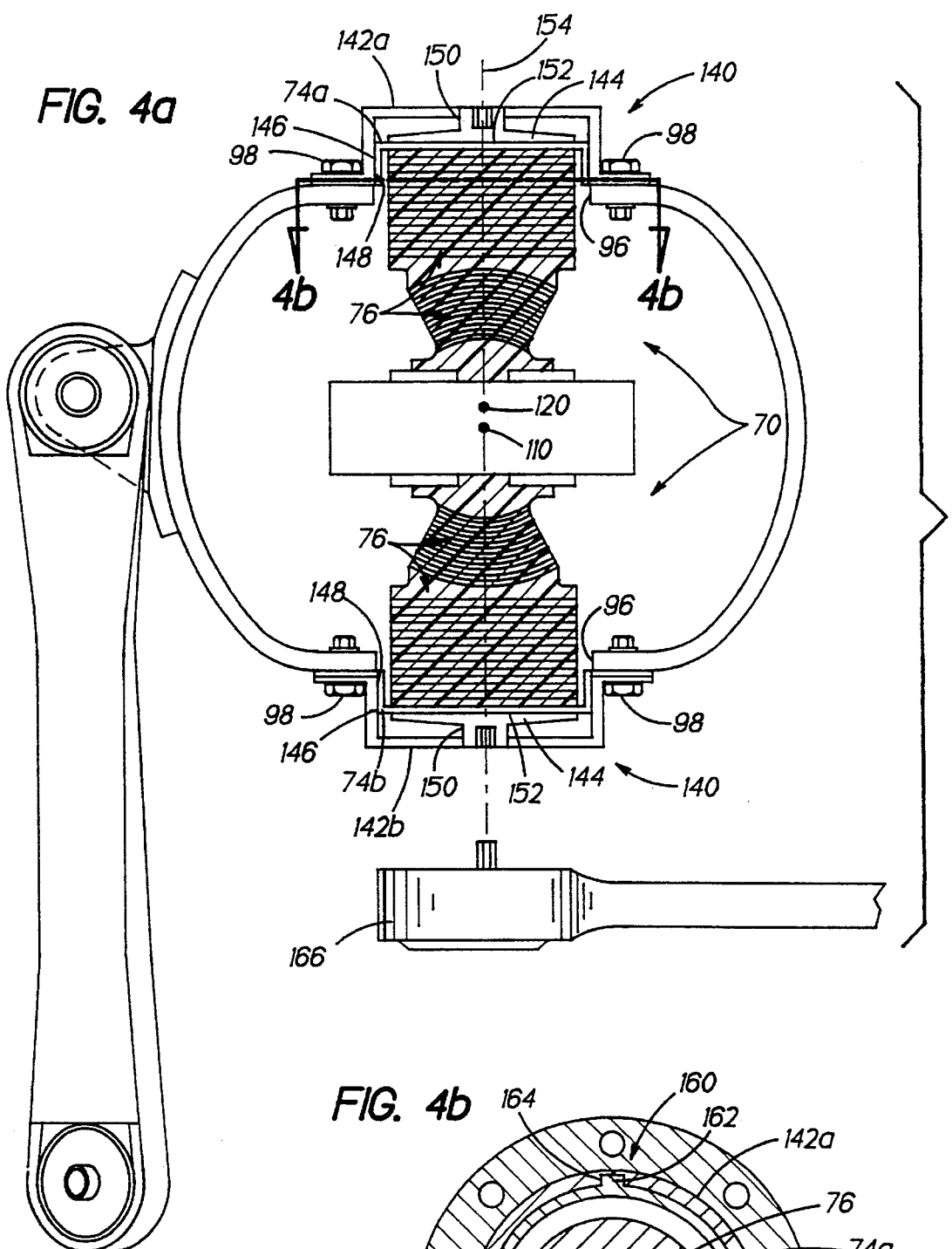
FIG. 4a depicts an alternate embodiment of the present invention which shows a jacking arrangement for effecting pitch change adjustment while, concomitantly, applying a compressive preload in an elastomeric centering bearing.
Figure 4B:
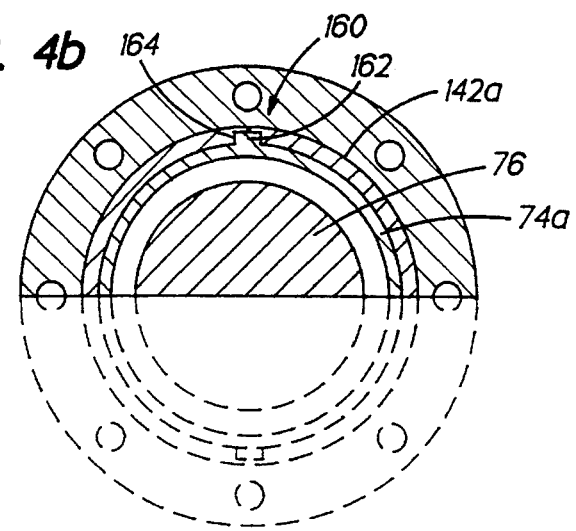
FIG. 4b is a cross-sectional view substantially along line 4b—4b of FIG. 4a which depicts an anti-rotation key for preventing the imposition of in-plane torsion load in the elastomeric centering bearing.

In FIG. 4a a jacking arrangement 140 functionally replaces the adjustment shims 102 described hereinabove for effecting translational displacement of the torque tube center 120. Furthermore, the attachment fittings 74a, 74b are reconfigured for mateably engaging the jacking arrangement 140. The jacking arrangement 140 includes upper and lower housing members 142a, 142b having respective jacking plates 144 disposed therein. Connecting bolts 98 mount the upper and lower housing members 142a, 142b to the torque tube member 36 in areas corresponding to the torque tube apertures 96. Each of the housing members 142a, 142b, furthermore, includes a pilot surface 146 for accepting a peripheral bearing surface 148 defined by each of the upper and lower attachment fittings 74a, 74b, which pilot surface 146 mechanically interconnects the centering bearing 70 to the torque tube member 36 while, furthermore, permitting axial translation thereof. Each of the housing members 142a, 142b also includes a threaded portion 150 for threadably engaging the corresponding jacking plate 144, whereby rotation thereof effects linear displacement within each of the housing members 142a, 142b. The jacking plates 144 engage the outer surfaces 152 defined by each of the attachment fittings 74a, 74b and, are operative to reposition the fittings 74a, 74b relative to the housing members 142a, 142b, thereby raising or lowering the torque tube center 120 relative to the torque tube pivot point 110. That is, for example, by rotating the jacking plates 144 in equal amounts in opposite directions about rotational axis 154 i.e., in clockwise and counterclockwise directions, the torque tube center 120 is raised or lowered with respect to the torque tube pivot point 110.

The pilot and peripheral bearing surfaces 146, 148 are sufficient in length to permit the necessary translational displacement of the torque tube member 36 relative to the attachment fittings 74a, 74b while maintaining the necessary coupled engagement therebetween. For example, to effect the maximum pitch adjustment of ±1 degree, the translational displacement is approximately ±3.8 cm (0.15 inches) for a torque tube member 36 having an arm radius of 216 cm (8.5 inches). Accordingly, the pilot-peripheral bearing interfaces should be greater than about 20.3 cm (0.8 inches) in length to accommodate translational displacement and properly capture the attachment fittings 74a, 74b.

To avoid the imposition of torsional loads in the elastomer 76 of the centering bearing 70, a means 160 (see FIG. 4b) may be employed for preventing rotation of the attachment fittings 74a, 74b relative to the housing members 142a, 142b and about rotational axis 154. Preferably, an anti-rotation key 162 is formed in the attachment fittings 74a, 74b along the peripheral bearing surfaces thereof, which key 162 engages a slot 164 formed in the housing members 142a, 142b along the pilot surfaces 146 thereof. While any means for preventing rotation may be incorporated, such as a polygonal shaped interface between the pilot and peripheral bearing surfaces 146, 148, the anti-rotation means must accommodate axial translation of the attachment fittings 74a, 74b.

In addition to providing pitch position adjustment, the jacking arrangement 140 concomitantly functions as a preload device to apply a compressive preload in the elastomer 76 of the centering bearing 70. As discussed earlier, the conventional approach for preloading an elastomeric centering bearing 70 involves the predetermination of a preload gap between the attachment fittings 74a, 74b and the torque tube member 36 such that a predictable compressive preload is applied to the elastomer 76. The parameters which are evaluated to determine the size of the preload gap generally include the predicted spring rate stiffness of the centering bearing 70, the predicted spring rate stiffness of the torque tube member 36, and manufacturing tolerances associated with the centering bearing 70, the torque tube member 36 and the flexbeam connector 22. Insofar as material differences and manufacturing deviations will vary slightly from one blade assembly 20 to another, it is not possible to ensure that the proper preload has been applied using conventional approaches. The jacking arrangement 140 of the present invention, on the other hand, ensures that the proper compressive preload is applied irrespective of material differences and manufacturing deviations. That is, for example, once the jacking plates 144 are properly positioned for establishing the desired pitch position, torque is equally applied to the jacking plates 144 e.g., rotating both jacking plates in a clockwise direction, so as to cause convergence thereof toward the torque tube pivot point 110. Accordingly, the jacking plates 144 engage the attachment fittings 74a, 74b to establish the desired preload in the elastomeric laminates. This operation should be performed without influencing the earlier established pitch setting. Alternatively, pitch adjustment operations may be performed subsequent to the application of preload, however, a steady torque value must be maintained during the pitch adjustment procedure.

The preload may be measured using a load measurement device such as a torque wrench 166 wherein the jacking plates 144 provide feedback thereto for indicating the applied preload. The following method/analysis is useful for calculating the torque necessary to produce a desired preload of 10752N (2400 lbs.) in the elastomeric centering bearing 70. First, the centering bearing 70 is placed in a holding fixture (not shown) to determine the spring rate stiffness of the bearing wherein a load is applied and recorded to produce a deflection of 0.127 cm (0.05 inches). Second, the spring rate stiffness of the elastomeric centering bearing 70 is calculated in accordance with equation (1):

$$K=P/0.127 \text{ cm} \qquad (1)$$

wherein K is the spring rate stiffness of the elastomeric centering bearing 70, and P is the applied load. Next, the deflection δ required to produce a desired preload of 10752N (2400 lbs.) is determined by equation (2):

$$\delta=10752 \text{ N}/K \qquad (2)$$

The final step requires measurement of the torque required to produce the deflection δ in the centering bearing 70 which can then be applied to future rotor blade assemblies in applying the proper preload. The jacking arrangement is therefore unaffected by material differences and manufacturing deviations insofar as the preload is measurable with each installation.

By combining the displacement means 102 or 140 with the torque tube centering means i.e., the centering bearing 70, the control rod 48 may be fixed in length and/or fabricated from lightweight composite material. Referring again to FIG. 3b, the preferred fixed length composite control rod 48 is comprised of high strength reinforcing composite fibers, such as graphite, fiberglass or aramid fibers, disposed in a binding resin matrix. The control rod 48 includes upper and lower rod end portions 170 and a center body portion 174 disposed therebetween. The primary load carrying element of the control rod 48 is a composite winding having looped end portions 176 which circumscribe metallic or elastomeric rod end bearings 178 to form the upper and lower rod end portions 170. The looped end portions 176 furthermore, transition to form longitudinal strap members 180, 182 which are the primary load carrying elements of the center body portion 174. Referring to FIG. 5, the center body portion 174 additionally comprises a chopped fiber matrix filler 184 i.e., randomly oriented fibers in a binding matrix, disposed between and integrally formed with the strap members 180, 182, and a transverse composite wrap 186 which is circumferentially wound about the filler 184 and strap members 180, 182. The transverse wrap 186 functions to strengthen the bond between the filler 184 and strap members 180, 182 and provide buckling stability therefor.

The use of a fixed-length composite control rod 48 in combination with the displacement means 102 or 104 described herein provides substantial weight savings when compared to prior art pitch adjustment mechanisms. In a weight-critical vehicle such as a rotorcraft, weight economy, on the order of a few kilograms, can yield significant cost savings and performance benefits. For example, when comparing the weight associated with a ship-set of pitch control rods 48 (a ship-set is 5 control rods for a five-bladed rotor assembly), a fixed-length composite control rod 48 offers a weight savings of 25% to 30% or approximately 6.13 kg. (13.5 lbs) for a five bladed rotor assembly as compared to adjustable metal control rods. The additional weight of, for example, the adjustment shims 102 i.e., reclaims approximately 1.6 kg. (3.5 lbs) of the weight savings, thereby resulting in a positive weight savings of about 4.54 kg. (10 lbs.) The weight associated with the jacking arrangement 140 reclaims a larger portion of the total weight savings, i.e., approximately 5.44 kg. (12 lbs), however, a positive weight savings is, nevertheless, realized. While the weight savings associated with the jacking arrangement 140 is less dramatic, the ease of performing pitch adjustment, coupled with the ability to properly preload the elastomeric centering bearing 70, makes the use of the jacking arrangement 140 an attractive alternative to the use of adjustment shims 102.

The displacement means 102 or 140 described herein provides a simple and reliable method for effecting pitch change adjustment. The adjustment shims 102 reduce the complexity and multiplicity of component parts associated with prior art pitch adjustment mechanisms while, furthermore, providing enhanced fail-safe reliability. With regard to the latter, fail-safe retention is provided by the plurality of connecting bolts 98, which are employed for connecting the attachment fittings 74a, 74b to the torque tube member 36. The jacking arrangement 140 facilitates pitch change adjustment while furthermore, applying a compressive preload in the elastomeric centering bearing 70. The jacking arrangement 140 obviates the need for painstaking and laborious disassembly required by prior art pitch adjustment mechanisms, while furthermore, enabling the relaxation of costly manufacturing requirements e.g., material specifications and highly precise manufacturing tolerances, necessitated by preload devices/methods of the prior art.

Although the invention has been described with respect to the use of adjustment shims 102 or a jacking arrangement 140 to effect translational displacement of the torque tube member 36, it will be appreciated that other adjustment schemes utilizing or modifying the centering bearing 70 to cause such displacement can be employed. Furthermore, while the invention as described herein employs an elastomeric centering bearing 70 to effect an articulate mount between the torque tube member 36 and the flexbeam connector 22, it should be understood that any centering arrangement which accommodates pitch motion of the torque tube member 36 relative to the flexbeam connector 22 can be employed while remaining within the spirit and scope of the invention. For example, a centering bearing which provides pure rotational displacement of the torque tube member 36 can be employed. Furthermore, while the invention preferably utilizes a fixed-length composite control rod 48, a metallic pitch control rod of the fixed or variable length variety may be incorporated. Regarding the use of a variable length pitch control rod, the present invention is useful to provide a broader range of pitch adjustment than is currently available.

Moreover, those skilled in the art will recognize that the foregoing and other changes, omissions and additions may be made to the exemplary embodiments described herein without departing from the spirit and scope of the present invention.

What is claimed is:

1. A pitch adjustment assembly (100) for a bearingless rotor assembly (10) having a rotor blade assembly (20) including a torque tube member (36) enveloping a flexbeam connector (22), the torque tube member (36) defining a geometric center (120) and being operative to impart pitch motion to the rotor blade assembly (20), said pitch adjustment assembly (100) comprising:

> means (70) for centering an inboard end (38) of the torque tube member (36) relative to the flexbeam connector (22), said centering means (70) defining a torque tube pivot point (110) about which the torque tube member (36) is rotationally displaced relative to the flexbeam connector (22);
>
> means (46, 48) for imparting pitch control inputs to the torque tube member (36), said pitch control input means (46, 48) defining an input pivot point (116); and,
>
> displacement means (102 or 140), in combination with said centering means (70), for effecting translational displacement of the geometric center (120) of the torque tube member (36) relative to said torque tube and input pivot points (110, 116).

2. The pitch adjustment assembly (100) according to claim 1 wherein said displacement means (102 or 140) includes at least one adjustment shim (102) interposed between the torque tube member (36) and said centering means (70).

3. The pitch adjustment assembly (100) according to claim 1 wherein said centering means (70) is a centering bearing (70) including:

> a central mounting portion (72) connecting to the flexbeam connector (22); and,
>
> upper and lower attachment fittings (74a, 74b) connecting to the torque tube member (36);
>
> and wherein said displacement means (102 or 140) includes at least one adjustment shim (102) interposed between the torque tube member (36) and at least one of said attachment fittings (74a, 74b).

4. The pitch adjustment assembly (100) according to claim 3 wherein said centering bearing (70) is comprised of motion accommodating elastomer (76) disposed between said central mounting portion (72) and said attachment fittings (74a, 74b).

5. The pitch adjustment assembly (100) according to claim 1 wherein said pitch control input means (46, 48) includes a pitch control arm (46) affixed to an inboard end (38) of the torque tube member (36), and a fixed-length pitch control rod (48) connecting to said pitch control arm (46).

6. The pitch adjustment assembly (100) according to claim 5 wherein said fixed-length pitch control rod (48) is comprised of high strength reinforcing fibers disposed in a binding resin matrix.

7. The pitch adjustment assembly (100) according to claim 1 wherein said centering means (70) is a centering bearing (70) including:

> a central mounting portion (72) connecting to the flexbeam connector (22);
>
> upper and lower attachment fittings (74a, 74b), each of said attachment fittings (74a, 74b) having an outer surface (152) and a peripheral bearing surface (148); and,
>
> wherein said displacement means (102 or 140) is a jacking arrangement (140) including:
>
> upper and lower housing members (142a, 142b), each of said housing members (142a, 142b) mounting to the torque tube member (36) and having a pilot surface (146) for accepting and guiding one of said peripheral bearing surfaces (148) of said attachment fittings (74a, 74b); and,
>
> a jacking plate (144) disposed within each of said housing members,
>
> said jacking plates (144) engaging said outer surfaces (152) of said attachment fittings (74a, 74b) and being operative, in combination with said housing members (142a, 142b), to effect said translational displacement.

8. The pitch adjustment assembly (100) according to claim 7 wherein said housing members (142a, 142b) each include a threaded portion (150), and wherein said jacking plates (144) threadably engage the threaded portions (150) of said housing members (142a, 142b).

9. The pitch adjustment assembly (100) according to claim 8 wherein said displacement means (102 or 140) further includes means (160) for preventing rotation of said attachment fittings (74a, 74b).

10. A pitch adjustment assembly (100) for a bearingless rotor assembly (10) having a rotor blade assembly (20) including a torque tube member (36) enveloping a flexbeam connector (22), the torque tube member (36) defining a geometric center (120) and being operative to impart pitch change motion to the rotor blade assembly (20), the pitch adjustment assembly (100) comprising:

> means (70) for centering an inboard end (38) of the torque tube member (36) relative to the flexbeam connector (22), said centering means (70) defining a torque tube pivot point (110) about which the torque tube member (36) is rotationally displaced relative to the flexbeam connector (22);
>
> means (46, 48) for imparting pitch control inputs to the torque tube member (36), said pitch control input means (46, 48) defining an input pivot point (116);
>
> said torque tube and input pivot points (110, 116) defining a pitch reference line (130);
>
> said input pivot point (116) and said geometric center (120) of the torque tube member (36) defining a pitch adjustment line (132);
>
> said reference and pitch lines (130, 132) forming a pitch angle θ; and,
>
> displacement means (102 or 140), in combination with said centering means (70), for effecting translational displacement of the geometric center (120) of the torque tube member (36) relative to said torque tube and input pivot points (110, 116);
>
> whereby said displacement means (102 or 140) varies said pitch angle θ.

11. A preload device (140) for applying a compressive preload to an elastomeric centering bearing (70), said centering bearing (70) having a motion accommodating elastomer (76) disposed between a torque tube member (36) and a flexbeam connector (22), said motion accommodating elastomer (76) being mechanically coupled to the flexbeam connector (22) at one end thereof and being operative to accommodate displacement of the torque tube member (36) relative to the flexbeam connector (22), the preload device (140) comprising:

> upper and lower attachment fittings (74a, 74b) mounting to the other end of the motion accommodating elastomer (76), each of said attachment fittings (74a, 74b) having an outer surface (152) and a peripheral bearing surface (148);
>
> upper and lower housing members (142a, 142b), each of said housing members (142a, 142b) mounting to the torque tube member (36) and having a pilot surface (146) for accepting and guiding one of said peripheral bearing surfaces (148) of said attachment fittings (74a, 74b); and, a jacking plate (144) disposed within each of said housing members (142a, 142b);

said jacking plates engaging said outer surfaces (152) of said attachment fittings (74a, 74b) and being operative, in combination with said housing members (142a, 142b) to apply a compressive preload in the motion accommodating elastomer (76).

12. The preload device (140) according to claim 10 further comprising:

load measurement means (166) for determining the magnitude of the compressive preload.

* * * * *